US011834020B2

United States Patent
Boehm et al.

(10) Patent No.: US 11,834,020 B2
(45) Date of Patent: Dec. 5, 2023

(54) ELECTROMECHANICALLY DRIVABLE BRAKE PRESSURE GENERATOR FOR A HYDRAULIC BRAKING SYSTEM OF A VEHICLE AND VEHICLE INCLUDING AN ELECTROMECHANICAL BRAKE PRESSURE GENERATOR

(71) Applicant: Robert Bosch GmbH, Stuttgart (DE)

(72) Inventors: Mark Boehm, Lehrensteinsfeld (DE); Claus Oehler, Karlsruhe (DE); Matthias Greiner, Simmozheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 308 days.

(21) Appl. No.: 16/845,605

(22) Filed: Apr. 10, 2020

(65) Prior Publication Data

US 2020/0339089 A1    Oct. 29, 2020

(30) Foreign Application Priority Data

Apr. 25, 2019  (DE) .......................... 102019205975.9

(51) Int. Cl.
*B60T 13/74*  (2006.01)
*F15B 15/20*  (2006.01)
*F15B 15/08*  (2006.01)

(52) U.S. Cl.
CPC ........... *B60T 13/745* (2013.01); *F15B 15/088* (2013.01); *F15B 2015/206* (2013.01); *F15B 2211/526* (2013.01)

(58) Field of Classification Search
CPC ...... B60T 13/686; B60T 13/662; B60T 13/66; B60T 13/745; B60T 17/02; F15B 15/088
See application file for complete search history.

(56) References Cited

FOREIGN PATENT DOCUMENTS

| CN | 108454603 A | * | 8/2018 | ............ B60T 13/145 |
|---|---|---|---|---|
| DE | 102012208739 A1 | * | 11/2013 | ............ B60T 13/662 |
| DE | 102015204439 A1 | * | 10/2015 | ............ B60T 13/745 |
| DE | 102018211443 A1 | * | 1/2020 | ............ B60T 11/04 |
| WO | 2017045804 A1 | | 3/2017 | |
| WO | WO-2017089008 A1 | * | 6/2017 | ............ B60T 13/146 |
| WO | WO-2019037965 A1 | * | 2/2019 | ............ B60T 13/745 |

OTHER PUBLICATIONS

Machine Translation of DE 10201211443, WO2019037965 and WO2017089008.*
CN108454603 Machine Translation attached to Foreign Document.*

* cited by examiner

*Primary Examiner* — Kenneth Bomberg
*Assistant Examiner* — Daniel S Collins
(74) *Attorney, Agent, or Firm* — NORTON ROSE FULBRIGHT US LLP; Gerard Messina

(57) ABSTRACT

An electromechanically drivable brake pressure generator for a hydraulic braking system of a vehicle, including an electric motor unit, which is activatable with the aid of an electronic control unit in accordance with a brake pressure to be applied and whose rotary motion generated thereby is converted by a reducing gearbox unit including an output-side spindle drive unit into a translatory motion for actuating a piston of a hydraulic piston/cylinder unit. A hydraulic block of the piston/cylinder unit also at least partially accommodates the electric motor unit in such a way that a motor shaft of the electric motor unit extending at least predominantly in the area of the hydraulic block is situated axially parallel to a longitudinal axis of the piston of the piston/cylinder unit which is movable in the hydraulic block.

20 Claims, 2 Drawing Sheets

ELECTROMECHANICALLY DRIVABLE BRAKE PRESSURE GENERATOR FOR A HYDRAULIC BRAKING SYSTEM OF A VEHICLE AND VEHICLE INCLUDING AN ELECTROMECHANICAL BRAKE PRESSURE GENERATOR

CROSS REFERENCE

The present application claims the benefit under 35 U.S.C. § 119 of German Patent Application No. DE 102019205975.9 filed on Apr. 25, 2019, which is expressly incorporated herein by reference in its entirety.

The present invention relates to an electromechanically drivable brake pressure generator for a hydraulic braking system of a vehicle and to a vehicle including an electromechanical brake pressure generator. The electromechanical brake pressure generator is equipped with an electric motor unit, which is activatable with the aid of an electronic control unit in accordance with a brake pressure to be applied and whose rotary motion generated thereby is converted by a reduction gearbox unit including an output-side spindle drive unit into a translatory motion for actuating a piston of a hydraulic piston/cylinder unit.

Alternative brake pressure buildup devices are needed for future drive concepts of motor vehicles since low pressure is no longer available to operate a conventional vacuum brake booster. For this purpose, the electromechanical brake pressure generators in accordance with the present invention are provided.

In an electromechanically drivable brake pressure generator of the type of interest here, the brake pressure on the piston/cylinder unit is generated with the aid of an electric motor or another suitable electric drive. Such brake pressure generators may not only be used to provide an auxiliary force, but in so-called brake by wire systems also to single-handedly generate the brake actuating force. Electromechanical brake pressure generators are thus of advantage, in particular, with respect to autonomous driving.

BACKGROUND INFORMATION

In conventional electromechanical brake pressure generators, an input rod moves relative to the piston of a hydraulic brake cylinder unit during actuation of the brake pedal. This differential path is measured with the aid of an electronic pedal travel sensor and forwarded to an electronic control unit. The control unit calculates corresponding activation signals for an electric drive motor. The motor torque is converted into a supporting force for the driver with the aid of a multi-stage gear. The force supplied by this booster is converted into hydraulic pressure in a hydraulic piston/cylinder unit for braking. The electromechanical brake pressure generator provides a braking feel which is comparable to conventional vacuum brake pressure generators. In this way, the braking feel may be adapted to brand-specific characteristics of a vehicle with the aid of the electronic control unit using software.

An electromechanical brake pressure generator of the type in question is described in PCT Application No. WO 2017/045804 A1. The brake pressure generator includes an electric drive motor which is operatively connected to a spindle drive unit with the aid of a multi-stage spur gear in such a way that a rotation of the electric drive motor causes a translatory motion of a spindle of the spindle drive unit for actuating the master brake cylinder. The multi-stage spur gear, however, generates a relatively large distance in the radial direction with respect to the spindle drive unit, at a relatively low gear ratio, so that the entire assembly of this electromechanical brake pressure generator ends up quite large.

It is an object of the present invention to provide an electromechanical brake pressure generator which is characterized by an installation space-saving design having short electrical and mechanical connecting paths.

SUMMARY

The object may be achieved by an electromechanical brake pressure generator according to an example embodiment of the present invention. Advantageous refinements of the present invention are described herein. The present invention also includes a vehicle including a hydraulic braking system including the electromechanical brake pressure generator according to the present invention.

The present invention encompasses the technical teaching that a hydraulic block of the piston/cylinder unit, within the meaning of a shared housing, also at least partially accommodates the electric motor unit in such a way that a motor shaft of the electric motor unit extending at least predominantly in the area of the hydraulic block is situated axially parallel to the longitudinal axis of a piston of the piston/cylinder unit which is axially movable in the hydraulic block.

The advantage of the approach according to the present invention is, in particular, that a separate housing for the electric motor unit may be entirely dispensed with. The reason is that the hydraulic block forms the housing environment for both the piston/cylinder unit and the electric motor unit. In this way, a compact shape of the entire electromechanical brake pressure generator, in particular, in the axial direction, may be achieved. In contrast to a convention externally situated electric motor unit, the electric motor unit integrated into the hydraulic block according to the present invention benefits from an improved thermal connection to the hydraulic block, which represents a relatively high thermal mass, so that the cooling of the electric motor unit is improved compared to the related art due to increased heat dissipation.

According to one preferred specific embodiment, it is provided to manufacture the functionally integrated hydraulic block according to the present invention from a light metal alloy, in particular, from an aluminum alloy, and to give it a cuboid bounding geometry. A cuboid bounding geometry shall be understood to mean the rough basic geometry of the hydraulic block, which may also have radii, recesses, integral moldings and the like in this regard. The selected light metal alloy promotes the desirably high heat dissipation due to the material-related high coefficient of thermal conduction.

According to one further aspect of the present invention, it is provided that the hydraulic bores of the hydraulic block, i.e., the cylinder space and the internal channel design, are matched to the cooling requirement of the electric motor unit in terms of dimensions. This means that the channels are guided preferably closely past the electric motor unit to optimize the heat dissipation.

According to one preferred specific embodiment of the present invention, the preferably cuboid hydraulic block includes a first end face at which the gearbox unit is directly situated. The gearbox unit is preferably designed as a multi-stage spur gear, which bridges center distance X between the electric motor unit and the spindle drive unit situated coaxially to the piston/cylinder unit. This yields a relatively flat gearbox unit, which only little increases the geometrical dimensions of the electromechanical brake pressure generator in the axial direction. In principle, this configuration, proceeding from the electric motor unit to the piston/cylinder unit, achieves an approximately U-shaped power flow, which forms the basic design concept of the compact design according to the present invention.

As a result of the optimized cooling according to the present invention and the reduced power losses due to the compact design, an electric motor unit having small dimensions compared to the related art may be used. As a consequence of the reduced heating of the electric motor unit, additionally a motor shaft operating temperature is achieved which also enables the use of gear wheels made up of plastic for creating the multi-stage spur gear. In this way, a lighter gearbox unit compared to the related art may be manufactured more efficiently.

Moreover, the integration of the electric drive motor into the stiff hydraulic block results in short tolerance chains between the electric drive unit and the gearbox unit, so that an optimal tooth engagement may be achieved in a simple manner. In addition, this is also accompanied by an improved vibration behavior, in particular, NVH (noise, vibration, harshness) behavior, so that noticeable vibrations in the vehicle due to the operation of the electromechanical brake pressure generator according to the present invention are avoided.

According to one further aspect of the present invention, it is provided that the preferably cuboid hydraulic block includes a second end face, which is situated opposite the first end face and at which the electronic control unit is directly situated. As a result of this special arrangement, a direct electrical connection of the electric motor unit to the electronic control unit is enabled, which also forms the prerequisite for a rotational speed and/or rotating direction sensor for the electric motor unit, which is situated in the area of the end of the motor shaft situated opposite the gearbox unit, to be preferably integrated into the electronic control unit. The integration of the electric motor unit into the hydraulic block and its direct electrical connection to the electronic control unit allows a direct electrical energy flow between the components, which results in comparatively lower heat-generating electric power losses.

According to one preferred specific embodiment of the electronic control unit, it is provided that it is designed in the form of components situated on a single electronic circuit board, which carry out both the electronic control of the motor unit and the hydraulic valve activation of the piston/cylinder unit. In this way, the electronic control unit—similarly to the gearbox unit—may also be designed to be relatively flat to further improve the compactness of the electromechanical brake pressure generator.

Further measures improving the present invention are shown hereafter in greater detail together with the description of one preferred exemplary embodiment of the present invention based on the figures.

DETAILED DESCRIPTION OF EXAMPLE EMBODIMENTS

Figure 1:
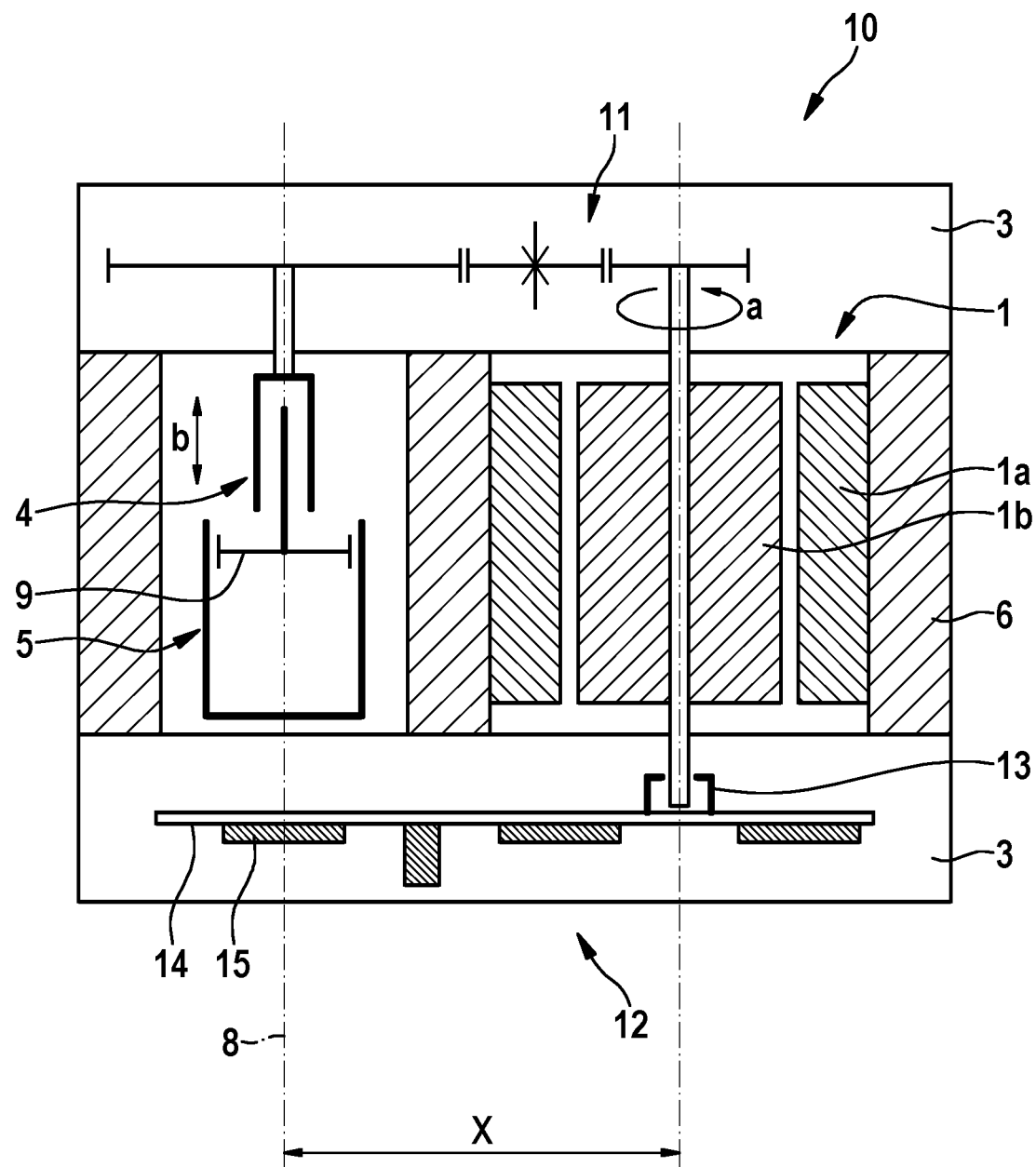
FIG. 1 shows a schematic side view of an example electromechanical brake pressure generator made up of the above-described main components.

According to FIG. 1, an electric motor unit 1 generates a driving rotary motion a in accordance with a specified braking intention. Electric motor unit 1 is made up of a stator 1a situated in a stationary manner with respect to a hydraulic block 6 and a rotor 1b corresponding thereto and connected to a shaft 7. Electric motor unit 1 is activated with the aid of an electronic control unit 2. Rotary motion a thus generated is converted with the aid of a reducing gearbox unit 3 including an output-side spindle drive unit 4 into a translatory motion b for actuating a piston of a hydraulic piston/cylinder unit 5.

In the electromechanical brake pressure generator having a compact design, hydraulic block 6 made up of a light metal also accommodates electric motor unit 1 for piston/cylinder unit 5 within the meaning of a functional integration, so that a separate housing therefor may be dispensed with. A motor shaft 7 of electric motor unit 1 extends axially parallel to a longitudinal axis 8 of piston 9 of piston/cylinder unit 5 which is axially movable in hydraulic block 6.

Gearbox unit 3 is directly situated on the generally cuboid hydraulic block 6 on the side of a first end face 10. In this exemplary embodiment, gearbox unit 3 is made up of a multi-stage spur gear 11, which renders slow, i.e., reduces, the rotational speed input by electric motor unit 1, and, at the same time, bridges a center distance X between electric motor unit 1 and spindle drive unit 4 situated coaxially to piston/cylinder unit 5.

Figure 2:
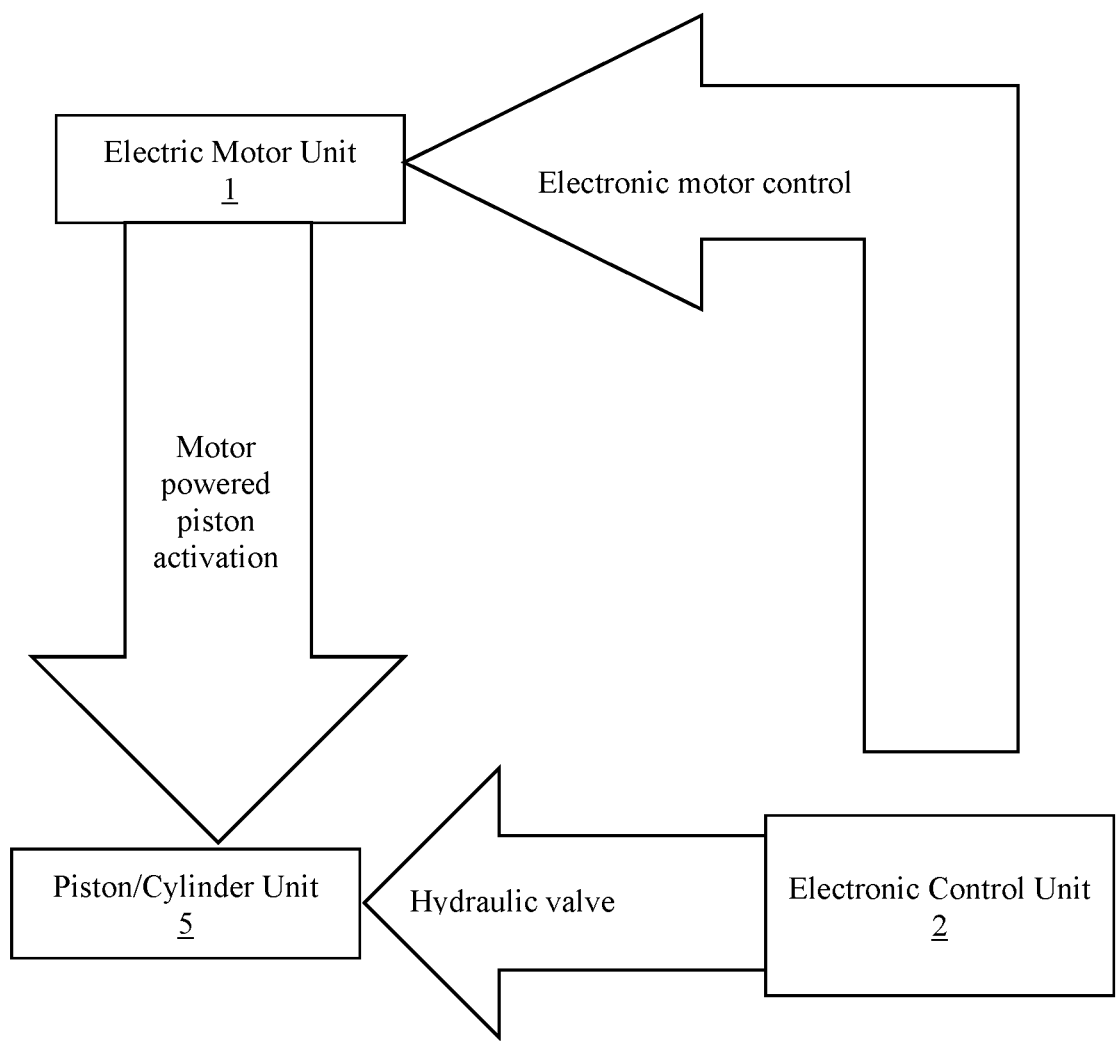
FIG. 2 is a flow diagram showing control performed by an electronic control unit.

Situated opposite first end face 10, cuboid hydraulic block 6 includes a second end face 12 extending in parallel thereto, at which electronic control unit 2 is directly situated. A rotational speed and/or rotating direction sensor 13 for electric motor unit 1 is integrated into electronic control unit 2. Rotational speed and/or rotating direction sensor 13 detects the rotational speed and/or the rotating direction of motor shaft 7 to forward a corresponding measuring signal to electronic control unit 2 for the control purposes which are conventional. In this exemplary embodiment, electronic control unit 2 is designed in the form of a single circuit board 14 on which various electronic components 15 (by way of example) are situated for carrying out the activation functions, including both an activation of electric motor unit 1 for a motor powered piston activation of piston/cylinder unit 5 and also for the hydraulic valve activation of piston/cylinder unit 5 as illustrated in FIG. 2.

The present invention is not limited to the above-described preferred exemplary embodiment. Rather, modifications thereof are also possible, which are also encompassed by the scope of the present invention. For example, it is also possible for gearbox unit 3 to be designed in another manner, for example as a traction drive mechanism or the like. Furthermore, it is sufficient when electric motor unit 1 is at least partially accommodated in hydraulic block 6 and, for example, also projects with a protruding portion into the directly abutting electronic control unit 2 or gearbox unit 3.

What is claimed is:

1. An electromechanically drivable brake pressure generator for a hydraulic braking system of a vehicle, comprising:
  a reducing gearbox unit that includes an output-side spindle drive unit;
  a hydraulic piston/cylinder unit that includes a piston;
  an electronic control unit;
  an electric motor unit that:
    includes a motor shaft;
    is activatable using the electronic control unit in accordance with a brake pressure to be applied; and
    is configured to generate a rotary motion which is converted by the reducing gearbox unit into a translatory motion for actuating the piston of the hydraulic piston/cylinder unit; and a hydraulic block that at least partially accommodates each of the piston/cylinder unit and the electric motor unit in such a way that the motor shaft of the electric motor unit extends at least predominantly in an area of the hydraulic block and is situated axially parallel to a longitudinal axis of the piston;

wherein:

the piston is movable in the hydraulic block; and the electromechanically drivable brake pressure generator includes at least one of the following three features (a)-(c):

(a) hydraulic bores of the hydraulic block are matched to a cooling requirement of the electric motor in terms of dimensions;

(b) the electromechanically drivable brake pressure generator further comprises a rotational speed and/or rotating direction sensor for the electric motor unit that is integrated into the electronic control unit and is situated in an area of an end motor shaft and at an opposite side of the hydraulic block than the gearbox unit; and (c) the electronic control unit includes, situated on a single circuit board, electronic components that carry out both electronic control of the motor unit and hydraulic valve activation of the piston/cylinder unit.

2. The electromechanically drivable brake pressure generator as recited in claim 1, wherein the motor shaft is non-coaxial with the longitudinal axis of the piston, the generated rotary motion is of the motor shaft, and the piston is movable in the hydraulic block.

3. The electromechanically drivable brake pressure generator as recited in claim 2, wherein:

the motor shaft is attached to a first spur gear wheel of the reducing gearbox unit and is coaxial with a rotation axis of the first spur gear wheel;

due to the attachment of the motor shaft to the first spur gear wheel, the generated rotary motion causes a corresponding rotation of the first spur gear wheel, which is converted by the reducing gearbox unit into a translatory motion for actuating the piston of the hydraulic piston/cylinder unit; and the conversion is realized by the first spur gear wheel causing a rotation of a second spur gear wheel to which a part of the output-side spindle drive unit is attached, which causes the part of the output-side spindle drive unit to spin coaxially with a rotation axis of the second spur gear wheel that is parallel to the rotation axis of the first spur gear wheel, the rotation axis of the second spur gear wheel being coaxial with the longitudinal axis of the piston.

4. The electromechanically drivable brake pressure generator as recited in claim 1, wherein the hydraulic bores of the hydraulic block are matched to the cooling requirement of the electric motor unit in terms of dimensions.

5. The electromechanically drivable brake pressure generator as recited in claim 1, wherein the hydraulic block is cuboidal and includes a first end face at which the gearbox unit is directly situated.

6. The electromechanically drivable brake pressure generator as recited in claim 5, wherein the gearbox unit is a multi-stage spur gear, which bridges a center distance between the electric motor unit and the spindle drive unit, and wherein the spindle drive unit is situated coaxially to the piston/cylinder unit.

7. The electromechanically drivable brake pressure generator as recited in claim 6, wherein gear wheels of the multi-stage spur gear are manufactured from a plastic material.

8. The electromechanically drivable brake pressure generator as recited in claim 5, wherein the cuboidal hydraulic block includes a second end face, which is situated opposite the first end face and at which the electronic control unit is directly situated.

9. The electromechanically drivable brake pressure generator as recited in claim 1, wherein the electromechanically drivable brake pressure generator further comprises the rotational speed and/or rotating direction sensor for the electric motor unit that is:

situated in the area of the end of the motor shaft and at the opposite side of the hydraulic block than the gearbox unit; and integrated into the electronic control unit.

10. The electromechanically drivable brake pressure generator as recited in claim 1, wherein the electronic control unit includes, situated on the single circuit board, the electronic components that carry out both the electronic control of the motor unit and the hydraulic valve activation of the piston/cylinder unit.

11. The electromechanically drivable brake pressure generator as recited in claim 1, wherein the hydraulic block is manufactured from an aluminum alloy.

12. The electromechanically drivable brake pressure generator as recited in claim 11, wherein the hydraulic block has a cuboid bounding geometry.

13. The electromechanically drivable brake pressure generator as recited in claim 1, wherein at least a portion of the motor shaft and at least a portion of the hydraulic piston/cylinder unit are situated side-by-side of each other in a direction that is perpendicular to the longitudinal axis of the piston and to a longitudinal axis of the motor shaft.

14. An electromechanically drivable brake pressure generator for a hydraulic braking system of a vehicle, comprising:

a reducing gearbox unit that includes an output-side spindle drive unit;

a hydraulic piston/cylinder unit that includes a piston;

an electronic control unit;

an electric motor unit that:

includes a motor shaft that is non-coaxial with a longitudinal axis of the piston;

is activatable using the electronic control unit in accordance with a brake pressure to be applied; and is configured to generate a rotary motion of the motor shaft which is converted by the reducing gearbox unit into a translatory motion for actuating the piston of the hydraulic piston/cylinder unit; and a hydraulic block that is manufactures from an aluminum alloy and that at least partially accommodates each of the piston/cylinder unit and the electric motor unit in such a way that the motor shaft of the electric motor unit extends at least predominantly in an area of the hydraulic block and is situated axially parallel to the longitudinal axis of the piston, wherein the piston is movable in the hydraulic block, wherein hydraulic bores of the hydraulic block have dimensions by which the hydraulic bores satisfy a cooling requirement of the electric motor unit.

15. A vehicle including an electromechanical brake pressure generator for a hydraulic braking system, the electromechanical brake pressure generator comprising:

a reducing gearbox unit that includes an output-side spindle drive unit;
a hydraulic piston/cylinder unit that includes a piston;
an electronic control unit;
an electric motor unit that:
  includes a motor shaft;
  is activatable using the electronic control unit in accordance with a brake pressure to be applied; and
  is configured to generate a rotary motion which is converted by the reducing gearbox unit into a translatory motion for actuating the piston of the hydraulic piston/cylinder unit; and
a hydraulic block that at least partially accommodates each of the piston/cylinder unit and the electric motor unit in such a way that the motor shaft of the electric motor unit extends at least predominantly in an area of the hydraulic block and is situated axially parallel to a longitudinal axis of the piston;
wherein:
  the piston is movable in the hydraulic block; and
  the electromechanically drivable brake pressure generator includes at least one of the following three features (a)-(c):
    (a) hydraulic bores of the hydraulic block are matched to a cooling requirement of the electric motor in terms of dimensions;
    (b) the electromechanically drivable brake pressure generator further comprises a rotational speed and/or rotating direction sensor for the electric motor unit that is integrated into the electronic control unit and is situated in an area of an end motor shaft and at an opposite side of the hydraulic block than the gearbox unit; and
    (c) the electronic control unit includes, situated on a single circuit board, electronic components that carry out both electronic control of the motor unit and hydraulic valve activation of the piston/cylinder unit.

16. The vehicle as recited in claim 15, wherein the motor shaft is non-coaxial with the longitudinal axis of the piston, the generated rotary motion is of the motor shaft, and the piston is movable in the hydraulic block.

17. The vehicle as recited in claim 16, wherein:
  the motor shaft is attached to a first spur gear wheel of the reducing gearbox unit and is coaxial with a rotation axis of the first spur gear wheel;
  due to the attachment of the motor shaft to the first spur gear wheel, the generated rotary motion causes a corresponding rotation of the first spur gear wheel, which is converted by the reducing gearbox unit into a translatory motion for actuating the piston of the hydraulic piston/cylinder unit; and
  the conversion is realized by the first spur gear wheel causing a rotation of a second spur gear wheel to which a part of the output-side spindle drive unit is attached, which causes the part of the output-side spindle drive unit to spin coaxially with a rotation axis of the second spur gear wheel that is parallel to the rotation axis of the first spur gear wheel, the rotation axis of the second spur gear wheel being coaxial with the longitudinal axis of the piston.

18. The vehicle as recited in claim 15, wherein the hydraulic bores of the hydraulic block are matched to the cooling requirement of the electric motor unit in terms of dimensions.

19. The vehicle as recited in claim 15, wherein the electromechanically drivable brake pressure generator further comprises the rotational speed and/or rotating direction sensor for the electric motor unit that is:
  situated in the area of the end of the motor shaft and at the opposite side of the hydraulic block than the gearbox unit; and
  integrated into the electronic control unit.

20. The vehicle as recited in claim 15, wherein the electronic control unit includes, situated on the single circuit board, the electronic components that carry out both the electronic control of the motor unit and the hydraulic valve activation of the piston/cylinder unit.

* * * * *